US007167982B2

(12) United States Patent
Elliott et al.

(10) Patent No.: US 7,167,982 B2
(45) Date of Patent: Jan. 23, 2007

(54) SECURING DECRYPTED FILES IN A SHARED ENVIRONMENT

(75) Inventors: Scott Thomas Elliott, Raleigh, NC (US); James Patrick Hoff, Raleigh, NC (US); Christopher Scott Long, Chapel Hill, NC (US); David Rivera, Durham, NC (US); James Peter Ward, Raleigh, NC (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 860 days.

(21) Appl. No.: 09/952,103

(22) Filed: Sep. 14, 2001

(65) Prior Publication Data

US 2003/0056095 A1 Mar. 20, 2003

(51) Int. Cl.
*H04L 9/00* (2006.01)

(52) U.S. Cl. .................. 713/164; 713/165; 713/189; 707/204

(58) Field of Classification Search ............... 713/165, 713/164; 380/4, 49; 705/62
See application file for complete search history.

(56) References Cited

U.S. PATENT DOCUMENTS

| 5,495,533 | A |   | 2/1996  | Linehan et al. ........... 380/21 |
|-----------|---|---|---------|-----------------------------------|
| 5,563,946 | A | * | 10/1996 | Cooper et al. ............ 705/56 |
| 5,584,022 | A | * | 12/1996 | Kikuchi et al. ............ 707/9 |
| 5,699,428 | A | * | 12/1997 | McDonnal et al. ........ 713/165 |
| 5,931,935 | A | * | 8/1999  | Cabrera et al. ........... 710/260 |
| 5,953,419 | A | * | 9/1999  | Lohstroh et al. .......... 713/165 |
| 5,956,408 | A | * | 9/1999  | Arnold ...................... 713/189 |
| 5,978,815 | A | * | 11/1999 | Cabrera et al. ........... 707/204 |
| 6,185,681 | B1| * | 2/2001  | Zizzi ........................ 713/165 |
| 6,615,349 | B1| * | 9/2003  | Hair ......................... 713/165 |
| 2001/0044901 | A1| * | 11/2001 | Grawrock ................... 713/189 |
| 2003/0097340 | A1| * | 5/2003  | Okamoto et al. ............ 705/65 |

FOREIGN PATENT DOCUMENTS

EP 0875868 A2 4/1998
WO WO 00/17731 3/2000

OTHER PUBLICATIONS

Wikipedia—the Free Encyclopedia, "Kernel (computer science)"; "http://en.wkipedia.org/wiki/kernel_space"; pp. 1-7.*
Wikipedia—the Free Encyclopedia, "Device Driver"; "http://en.wikipedia.org/wiki/Device_driver"; pp. 1-3.*
"Data Protection at the VOLUME Level," *IBM Technical Disclosure Bulletin*, via Internet at http://www.delphion.com/tdbs/tdb?o=88A%2061689, Oct. 1998, pp. 1-3.

* cited by examiner

*Primary Examiner*—Kambiz Zand
*Assistant Examiner*—Carl G Colin
(74) *Attorney, Agent, or Firm*—Robert A. Voigt, Jr.; Winstead Sechrest & Minick P.C.

(57) ABSTRACT

A method, system and computer program product for securing decrypted files in a shared environment. A filter driver in a kernel space may be configured to control service requests to encrypted files stored in a shared area, e.g., a shared directory on a disk unit, accessible by multiple users. The filter driver may receive a service request to open an encrypted document in the shared area issued from an authorized user. Upon receiving the encrypted data, the filter driver may decrypt the encrypted data. The filter driver may subsequently store the decrypted data in a file in a non-shared area, e.g., a non-shared directory. The non-shared area may be accessible only by the authorized user that requested access to the encrypted file. By storing the decrypted data in a file in the non-shared area, a file once decrypted may be protected in a file sharing environment.

33 Claims, 7 Drawing Sheets

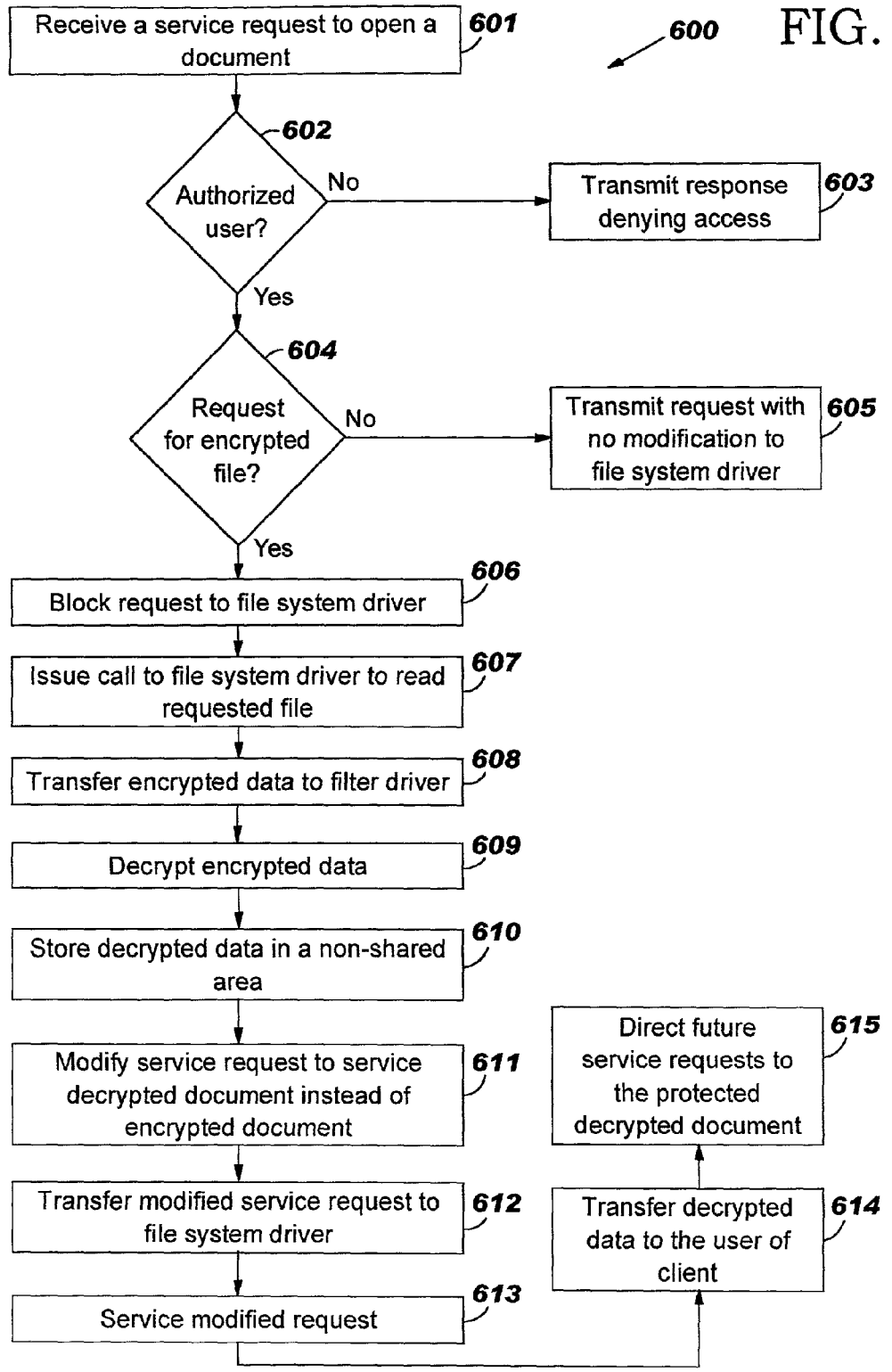

FIG. 7

701 Receive a request to save decrypted document

702 Issue a call to write the modification to the decrypted document to file system driver

703 Encrypt the modified decrypted document

704 Replace the document encrypted in step 703 with the encrypted document requested in step 601 of method 600 in the shared area

705 Delete the document stored in the non-shared area that was encrypted in step 703

SECURING DECRYPTED FILES IN A SHARED ENVIRONMENT

TECHNICAL FIELD

The present invention relates to the field of a file sharing environment, and more particularly to protecting a file once decrypted in a file sharing environment.

BACKGROUND INFORMATION

In a file sharing environment, clients may be coupled to a server where the server may maintain files in a shared directory accessible by users, i.e., users of the clients. These files may store a variety of information including sensitive information.

The protection of sensitive data is becoming a very important issue. For example, data such as personnel records or customer credit card numbers may be stored in these files. Information may be misappropriated in these files when an unauthorized individual gains access to the server and copies information from some or all of its files. Those authorized to access the sensitive information may not even know that it has been copied.

To protect information, one type of security procedure involves encrypting the data, so that even if the data falls into the wrong hands, it cannot be read without a key. Many application level programs provide some form of such encryption. Subsequently, the files maintained in the shared directory may be encrypted.

However, in a file sharing environment, when a user of a client requests to open a particular document, e.g., Microsoft™ Word document, software on the server may be configured to decrypt the encrypted document requested and replace the encrypted document with a decrypted document. By replacing the encrypted document with the decrypted document in the shared directory, the decrypted document is accessible by multiple users in a file sharing environment. By having the decrypted document accessible by multiple users, information in the file is not protected and hence a user may perform unwanted activities, e.g., erase files, reading files containing credit card numbers, etc.

It would therefore be desirable to protect decrypted files in a file sharing environment.

SUMMARY

The problems outlined above may at least in part be solved in some embodiments by a filter driver in a kernel space configured to control service requests to encrypted files stored in a shared area, e.g., a shared directory on a disk unit, accessible by multiple users. The filter driver may decrypt the encrypted data in the requested encrypted file and subsequently store the decrypted data in a file in a non-shared area, e.g., a non-shared directory. The non-shared area may be accessible only by the authorized user that requested access to the encrypted file. By storing the decrypted data in a file in the non-shared area, a file once decrypted may be protected in a file sharing environment.

In one embodiment of the present invention, a method for securing decrypted files in a shared environment may comprise the step of a filter driver in a kernel space receiving a service request to open a document in a file system issued from a user of a client. The document requested may be stored in a file in a shared area, e.g., a shared directory on a disk unit. Upon receiving the service request, the filter driver may determine if the request has been transmitted by an authorized user to open a document in an authorized application. If the request has been transmitted by an authorized user to open a document in an authorized application, then the filter driver may determine if the service request is a request to open an encrypted file. If the service request is a request to open an encrypted file in a shared area, then the filter driver may block the service request to a file system driver. The file system driver may be a driver that interfaces a file system maintained in the kernel space. The file system driver may be configured to service requests, e.g., read a file, to the file system.

The filter driver may issue a call to the file system driver to read the encrypted data in the requested file stored in the shared area from the file system. Upon reading the encrypted data, the file system driver may transfer the encrypted data to the filter driver. Upon receiving the encrypted data, the filter driver may decrypt the encrypted data. The filter driver may then store the decrypted data in a file in a non-shared area, e.g., a non-shared directory on the disk unit. The non-shared area may be accessible only by the authorized user that requested access to the encrypted file. By storing the decrypted data in a file in the non-shared area, a file once decrypted may be protected in a file sharing environment.

The filter driver may modify the service request to request the decrypted document stored in the non-shared area instead of the encrypted document stored in the shared area. For example, if the service request is a request to open a document, e.g., document.enc, then the filter driver may modify the service request to be a request to open the decrypted version of the document, e.g., document.decrypt. The modified request may then be transferred to the file system driver which may then service the request by opening the requested document, e.g., document.decrypt, and returning the decrypted data to the filter driver. The filter driver may transfer the decrypted data, i.e., decrypted file, to the user of the client that issued the service request.

The filter driver may direct future service requests issued from an authorized user, e.g., another authorized user, to open the encrypted document in an authorized application, that has already been decrypted in a file stored in a non-shared area, to the protected decrypted file. That is, the filter driver may modify the request to request the decrypted document stored in the non-shared area instead of the encrypted document stored in the shared area and then retrieve the decrypted data, i.e., decrypted file, as stated above.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which:

FIG. 6 is a flowchart of a method for securing decrypted files in a file sharing environment in accordance with the present invention; and FIG. 7 is a flowchart of a method for saving modifications to the decrypted document in accordance with the present invention.

DETAILED DESCRIPTION

Figure 1:
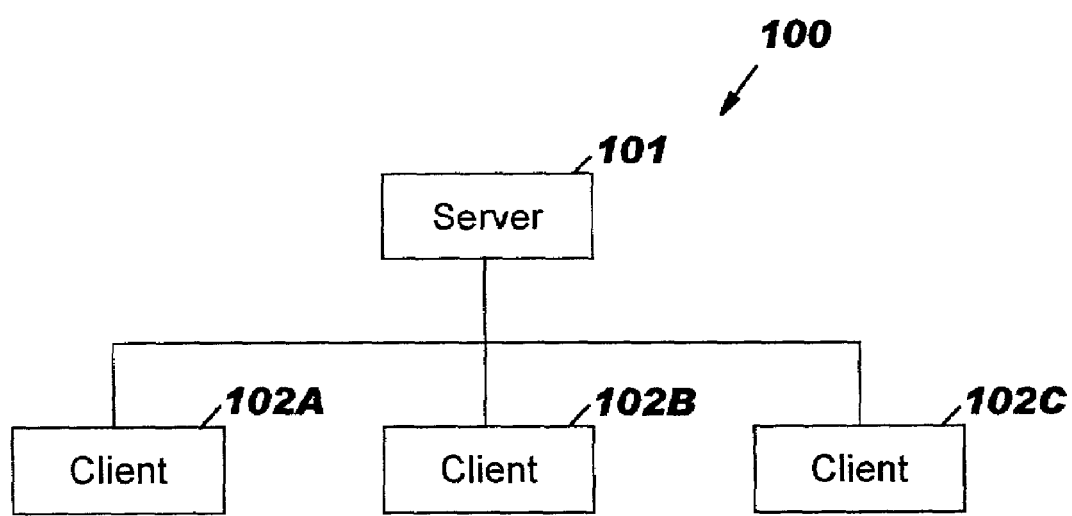
FIG. 1 illustrates a network system configured in accordance with the present invention.

FIG. 1—Network System

FIG. 1 illustrates one embodiment of the present invention of a network system 100. Network system 100 may comprise one or more clients 102A–C coupled to a server 101. Clients 102A–C may be configured to send requests to server 101 and server 101 may be configured to supply information to the one or more clients 102A–C. Clients 102A–C may collectively or individually be referred to as clients 102 or client 102, respectively. It is noted that network system 100 may comprise any number of clients 102 as well as any number of servers 101 and that FIG. 1 is illustrative. It is further noted that the connection between clients 102 and server 101 may be any medium type, e.g., wireless, wired. It is further noted that client 102 may be any type of device, e.g., wireless, Personal Digital Assistant (PDA), cell phone, personal computer system, workstation, Internet appliance, configured with the capability of connecting to the Internet and consequently communicating with server 101. It is further noted that network system 100 may be any type of system that has at least one server and at least one client and that FIG. 1 is not to be limited in scope to any one particular embodiment.

FIG. 2—Client

Figure 2:
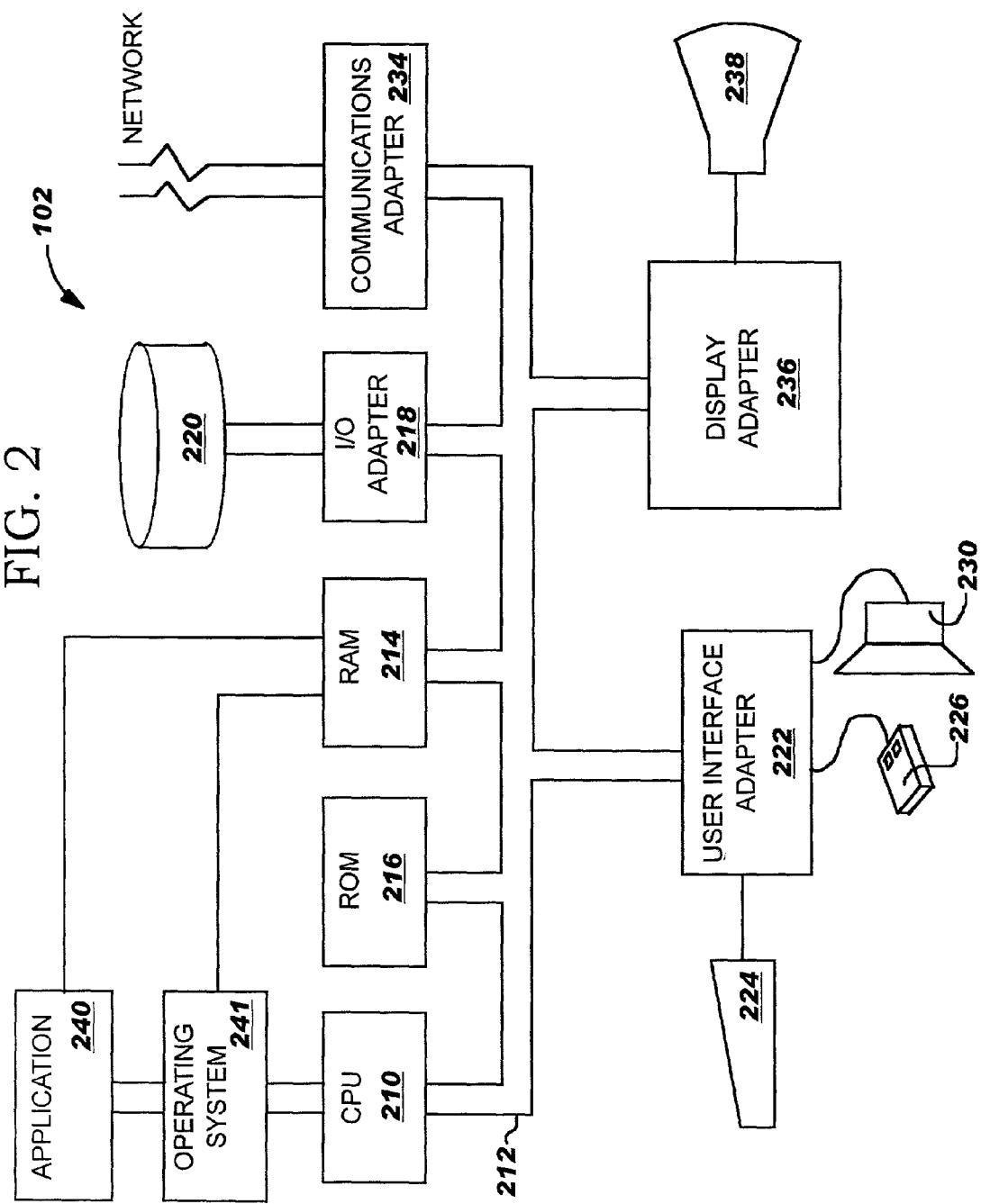
FIG. 2 illustrates an embodiment of the present invention of a client in a network system.

FIG. 2 illustrates a typical hardware configuration of client 102 which is representative of a hardware environment for practicing the present invention. Client 102 has a central processing unit (CPU) 210 coupled to various other components by system bus 212. An operating system 230 runs on CPU 110 and provides control and coordinates the function of the various components of FIG. 2. An application 240 in accordance with the principles of the present invention runs in conjunction with operating system 230 and provides output calls to operating system 230 where the output calls implement the various functions or services to be performed by application 240. Application 240 may include for example, a word processing application. Read only memory (ROM) 216 is coupled to system bus 212 and includes a basic input/output system ("BIOS") that controls certain basic functions of client 102. Random access memory (RAM) 214, I/O adapter 218, and communications adapter 234 are also coupled to system bus 212. It should be noted that software components including operating system 230 and application 240 are loaded into RAM 214 which is the computer system's main memory. I/O adapter 218 may be an integrated drive electronics ("IDE") adapter that communicates with disk unit 220, e.g., disk drive.

Communications adapter 234 interconnects bus 212 with an outside network enabling client 102 to communicate with server 101 via a Local Area Network (LAN), e.g., Ethernet, Token Ring, ARCnet, or a Wide Area Network (WAN), e.g., Internet. Input/Output devices are also connected to system bus 212 via a user interface adapter 222 and display adapter 236. Keyboard 224, mouse 226 and speaker 230 are all interconnected to bus 212 through user interface adapter 222. Event data may be input to client 102 through any of these devices. A display monitor 238 is connected to system bus 212 by display adapter 236. In this manner, a user is capable of inputting to client 102 through keyboard 224 or mouse 226 and receiving output from client 102 via display 238 or speaker 230.

Implementations of the invention include implementations as a computer system programmed to execute the method or methods described herein, and as a computer program product. According to the computer system implementation, sets of instructions for executing the method or methods are resident in the random access memory 214 of one or more computer systems configured generally as described above. Until required by the computer system, the set of instructions may be stored as a computer program product in another computer memory, for example, in disk drive 220 (which may include a removable memory such as an optical disk or floppy disk for eventual use in the disk drive 220). Further, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical, biological or some other physical change.

Figure 3:
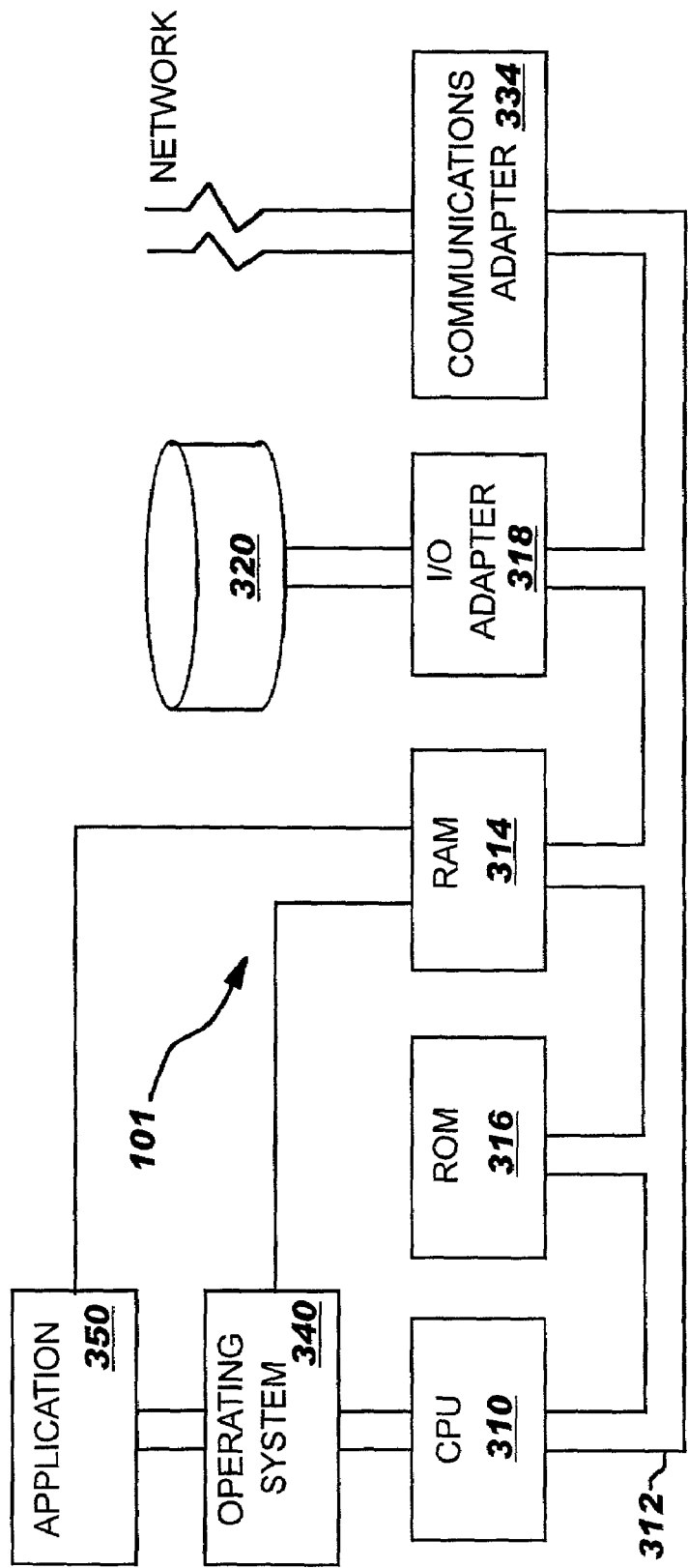
FIG. 3 illustrates an embodiment of the present invention of a server in a network system.

FIG. 3—Hardware Configuration of Server

FIG. 3 illustrates an embodiment of the present invention of server 101. Referring to FIG. 3, server 101 may comprise a central processing unit (CPU) 310 coupled to various other components by system bus 312. An operating system 340, e.g., AIX, UNIX, runs on CPU 310 and provides control and coordinates the function of the various components of FIG. 3. An application 350 in accordance with the principles of the present invention runs in conjunction with operating system 340 and provides calls to operating system 340 where the calls implement the various functions or services to be performed by application 350. Read only memory (ROM) 316 is coupled to system bus 312 and includes a basic input/output system ("BIOS") that controls certain basic functions of server 101. Random access memory (RAM) 314, disk adapter 318 and communications adapter 334 are also coupled to system bus 312. It should be noted that software components including operating system 340 and application 350 are loaded into RAM 314 which is the computer system's main memory. A description of at least a portion of the memory space of RAM 314 is provided in the description of FIG. 4.

Disk adapter 318 may be a small computer system interface ("SCSI") adapter that communicates with disk units 320, e.g., disk drive. It is noted that the program of the present invention that secures decrypted files in a shared environment, as described in FIG. 6, may reside in disk unit 320. Communications adapter 334 interconnects bus 312 with client 102 thereby enabling server 101 to communicate with client 102.

Implementations of the invention include implementations as a computer system programmed to execute the method or methods described herein, and as a computer program product. According to the computer system implementations, sets of instructions for executing the method or methods are resident in the random access memory 314 of one or more computer systems configured generally as described above. Until required by server 101, the set of instructions may be stored as a computer program product in another computer memory, for example, in disk drive 320 (which may include a removable memory such as an optical disk or floppy disk for eventual use in disk drive 320). Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 4:
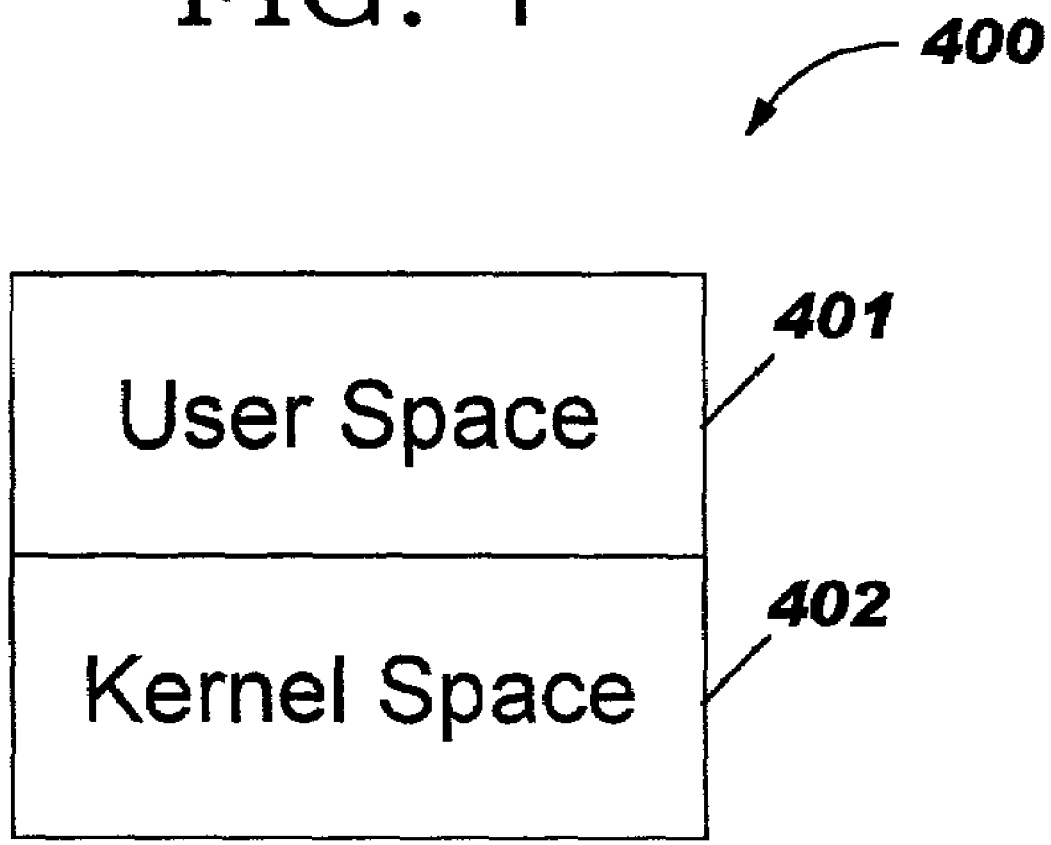
FIG. 4 illustrates a memory space of the server in the network system configured in accordance with the present invention.

FIG. 4—Memory Space of Server

FIG. 4 illustrates an embodiment of a memory space 400 of server 101 configured in accordance with the present invention. Memory space 400 may be logically divided into user space 401 and kernel space 402. User space 401 may refer to that portion of memory space 400 accessible by users. For example, user space 401 may store user applications, e.g., word processing, spreadsheet. Kernel space 402 may typically store the core portions of the software that performs the most essential operating system tasks, e.g., handling disk input and output operations, managing internal memory. That is, kernel space 402 may refer to operating system 340 that resides in memory at all times and provides the basic processing services.

Figure 5:
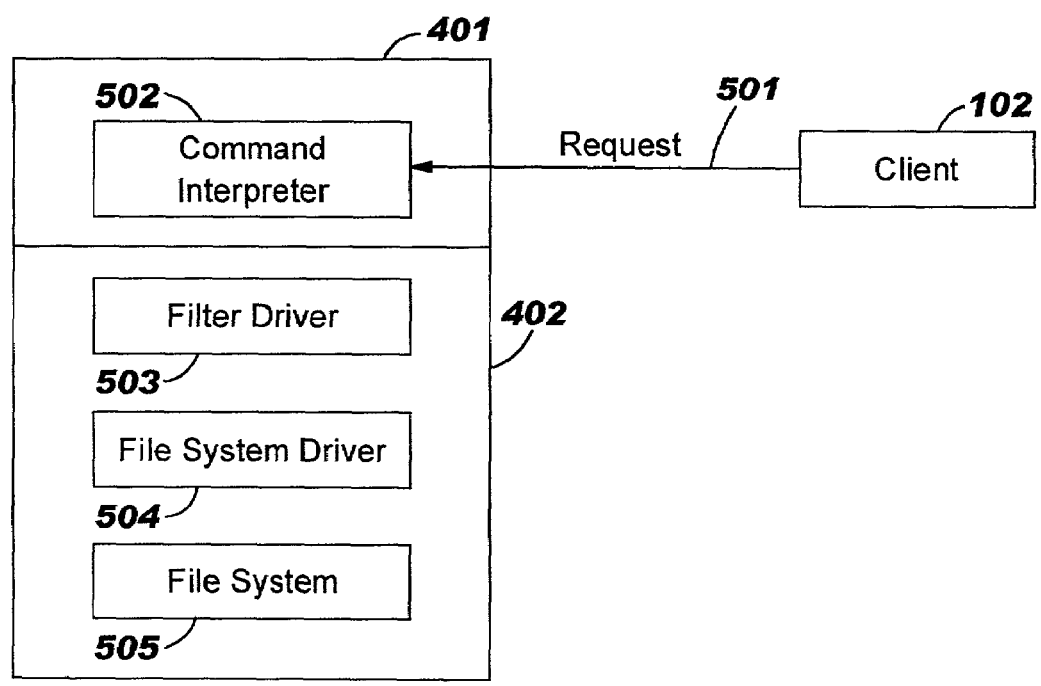
FIG. 5 illustrates a filter drive in a kernel space for protecting decrypted files in a file sharing environment in accordance with the present invention.

FIG. 5—Kernel Space With Filter Driver

FIG. 5 illustrates a filter driver 503 in kernel space 402 configured to protect decrypted files in a file sharing environment in accordance with the present invention.

Referring to FIG. 5, a user of client 102 may issue a service request 501 to open a document, e.g., document.enc, to server 101 which may be received by a command interpreter 502 in user space 401 of server 101. Command interpreter 502 may be configured to interpret the request. For a request to open a document, e.g., document.enc, command interpreter 502 may be configured to transfer the request to kernel space 402 of server 101. In accordance with the principles of the present invention, this request may be intercepted by a filter driver 503 in kernel space 402 that may be configured to filter the request. That is, filter driver 503 may be configured to control service requests to encrypted files as described in greater detail below.

If request 501 has been transmitted by an authorized user to open a document in an authorized application and if request 501 is a request to open an encrypted file in a shared area, e.g., shared directory on disk unit 320 of server 101, then filter driver 503 may be configured to block request 501 from being sent to file system driver 504. This will be described in greater detail in conjunction with FIG. 6. File system driver 504 may be configured to service requests, e.g., read file, to a file system 505. File system driver 504 may be a driver that interfaces file system 505 maintained in kernel space 402.

Filter driver 503 may be configured to issue a call to file system driver 504 to read the encrypted data in the requested file stored in a shared area, e.g., a shared directory on disk unit 320 of server 101, from file system 505. File system driver 504 may then be configured to transfer the encrypted data to filter driver 503.

Upon receiving the encrypted data, filter driver 503 may be configured to decrypt the encrypted data. Filter driver 503 may further be configured to store the decrypted data in a file in a non-shared area, e.g., a non-shared directory on disk unit 320 of server 101. The non-shared area may be accessible only by the authorized user that requested access to the encrypted file. By storing the decrypted data in a file in the non-shared area, a file once decrypted may be protected in a file sharing environment.

Filter driver 503 may further be configured to modify request 501 to request the decrypted document stored in the non-shared area instead of the encrypted document stored in the shared area. For example, if request 501 is a request to open a particular document, e.g., document.enc, filter driver 503 may modify request 501 to be a request to open the decrypted version of the document, e.g., document.decrypt. The modified request may then be transferred to file system driver 504 which may then service the request by opening the requested document, e.g., document.decrypt, and returning the decrypted data to filter driver 503. Filter driver 503 may then be configured to transfer the decrypted data, i.e., decrypted file, to the user of client 102 via command interpreter 502 in user space 401.

If filter driver 503 receives a subsequent request from another authorized user, to open the encrypted document, e.g., document.enc, in an authorized application, that has already been decrypted in a file stored in a non-shared area, then filter driver 503 may be configured to modify the request to request the decrypted document stored in the non-shared area instead of the encrypted document stored in the shared area as stated above. The modified request may then be transferred to file system driver 504 which may then service the request by opening the requested document and returning the decrypted data instead of the encrypted data to filter driver 503. Filter driver 503 may then be configured to transfer the decrypted data, i.e., decrypted file, to the authorized user making the subsequent request. In this way, security may be maintained because each decrypted copy is stored in a non-shared area. Methodologies for securing decrypted files in a shared environment and for saving decrypted files will be described in conjunction with FIGS. 6 and 7, respectively.

FIG. 6—Method for Securing Decrypted Files in a Shared Environment

FIG. 6 illustrates a flowchart of one embodiment of the present invention of a method 600 for securing decrypted files in a shared environment. As stated in the Background Information section, in a file sharing environment, when a user of a client requests to open a particular document, e.g., a Microsoft™ Word document, software on the server may be configured to decrypt the encrypted document requested and replace the encrypted document with a decrypted document. By replacing the encrypted document with the decrypted document in the shared directory, the decrypted document is accessible by multiple users in a file-sharing environment. By having the decrypted document accessible by multiple users, information in the file is not protected and hence a user may perform unwanted activities, e.g., erase files, reading files containing credit card numbers. It would therefore be desirable to protect decrypted files in a file-sharing environment. Method 600 is a method for securing decrypted files in a file-sharing environment.

In step 601, filter driver 503 (FIG. 5) may receive a service request to open a document, e.g., document.enc, in a file system 505 (FIG. 5) issued from a user of client 102. The document, e.g., document.enc, requested may be stored in encrypted form in a file in a shared area, e.g., a shared directory on disk unit 320. In step 602, upon receiving a service request, filter driver 503 may determine if the request has been transmitted by an authorized user to open a document in an authorized application. In one embodiment, filter driver 503 may access an access control list that may be stored in a storage medium, e.g., disk unit 320 (FIG. 3), storing an up-to-date listing of documents with associated authorized users and applications. For example, a user of client 102 may request to open a document, e.g., document.enc, in Microsoft™ Word. Filter driver 503 may then determine if the user of client 102 is authorized to open document.enc by accessing the access control list that stores a current listing of documents with associated authorized users and applications. If the user and application, e.g., Microsoft™ Word, are associated with the requested document, e.g., document.enc, then the user of client 102 may access the document. It is noted that there other means for providing authorization and that such means would be recognized by a person of ordinary skill. It is further noted that embodiments employing such means would fall within the scope of the present invention.

If the service request received in step 601 is not issued from an authorized user or the service request is a request to open a document in a non-authorized application, then filter driver 503 may transmit a response to the user of client 102 denying access in step 603.

If the service request received in step 601 has been transmitted by an authorized user to open a document in an authorized application then filter driver 503 may determine if the service request is a request to open an encrypted file in step 604. In one embodiment, filter driver 503 may determine if the service request is a request to open an encrypted file if the requested file has an extension of .enc. It is noted that there other means of determining if the service request is a request to open an encrypted file and that such means would be recognized by a person of ordinary skill. It is further noted that embodiments employing such means would fall within the scope of the present invention.

If the service request received in step 601 is not a request to open an encrypted file, then filter driver 503 may transmit the request with no modification of the request to file system driver 504 to service the request in step 605.

If the service request received in step 601 is a request to open an encrypted file in a shared area, e.g., a shared directory on disk unit 320 of server 101, then filter driver 503 may block the service request to file system driver 504 (FIG. 5) in step 606. File system driver 504 may be configured to service requests, e.g., read file, to file system 505. File system driver 504 may be a driver that interfaces file system 505 maintained in kernel space 402.

In step 607, filter driver 503 may issue a call to file system driver 504 to read the encrypted data in the requested file stored in a shared area, e.g., a shared directory on disk unit 320 of server 101, from file system 505. In step 608, file system driver 504 may transfer the encrypted data to filter driver 503.

In step 609, upon receiving the encrypted data, filter driver 503 may decrypt the encrypted data. In step 610, filter driver 503 may store the decrypted data in a file in a non-shared area, e.g., a non-shared directory on disk unit 320 of server 101. The non-shared area may be accessible only by the authorized user that requested access to the encrypted file. By storing the decrypted data in a file in the non-shared area, a file once decrypted may be protected in a file sharing environment.

In step 611, filter driver 503 may modify the service request to request the decrypted document stored in the non-shared area instead of the encrypted document stored in the shared area. As stated above, for example, if the service request is a request to open a document, e.g., document.enc, filter driver 503 may modify the service request to be a request to open the decrypted version of the document, e.g., document.decrypt. The modified request may then be transferred to file system driver 504 in step 612 which may then service the request in step 613 by opening the requested document, e.g., document.decrypt, and returning the decrypted data to filter driver 503. In step 614, filter driver 503 may transfer the decrypted data, i.e., decrypted file, to the user of client 102 that issued the service request.

Filter driver 503 may direct future service requests issued from an authorized user to open the encrypted document, e.g., document.enc, in an authorized application, that has already been decrypted in a file stored in a non-shared area, to the protected decrypted file in step 615. If filter driver 503 receives a subsequent request from another authorized user to open an encrypted document, e.g., document.enc, in an authorized application, that has already been decrypted in a file stored in a non-shared area, then filter driver 503 may be configured to modify the request as in step 611 to request the decrypted document stored in the non-shared area instead of the encrypted document stored in the shared area as stated above. The modified request may then be transferred to file system driver 504 as in step 612 which may then service the request as in step 613 by opening the requested document and returning the decrypted data instead of the encrypted data to filter driver 503. Filter driver 503 may then transfer the decrypted data, i.e., decrypted file, to the authorized user as in step 614.

It is noted that method 600 may be executed in a different order presented and that the order presented in the discussion of FIG. 6 is illustrative. It is further noted that certain steps may be executed almost concurrently.

FIG. 7—Method to Save Decrypted Document

FIG. 7 illustrates a flowchart of one embodiment of the present invention of a method 700 for saving modifications made to the decrypted document by the authorized user that received the decrypted data, i.e., decrypted file, in step 613 of method 600.

In step 701, filter driver 503 may receive a request to save the modifications made to the decrypted document by the authorized user that received the decrypted document in step 613 of method 600. In one embodiment, application 240 (FIG. 2), e.g., word processing application, may issue a request to save the modifications made to the decrypted document by the authorized user to filter driver 503 upon the authorized user executing a save command to save the modifications made to the decrypted document. In another embodiment, a service embodied in code that may reside in application 240 or disk unit 220 (FIG. 2) may search for the existence of a particular application, e.g., word processing application. If the particular application, e.g., word processing application, has been terminated and modifications have been made to the decrypted document, then the service may issue a request to save the modifications made to the decrypted document to filter driver 503.

In step 702, filter driver 503 may issue a call to file system driver 504 to write the modifications to the decrypted document stored in a non-shared area, e.g., a non-shared directory on disk unit 320 in server. In step 703, filter driver 503 may encrypt the data in the modified decrypted document. In step 704, filter driver 503 may replace the data in the encrypted document requested in step 601 of method 600 located in the shared area, e.g., a shared directory on disk unit 320, with the encrypted data in the document encrypted in step 703. In step 705, the document stored in the non-shared area, e.g., a non-shared directory on disk unit 320, that was encrypted in step 703 may be deleted by filter driver 503.

It is noted that method 700 may be executed in a different order presented and that the order presented in the discussion of FIG. 7 is illustrative. It is further noted that certain steps may be executed almost concurrently.

Although the system, computer program product and method are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for securing decrypted files in a shared environment comprising the steps of:
   receiving a service request to open a document by a first driver in a kernel space;
   issuing a call to a second driver in said kernel space to read a first file of said document located in a shared area, wherein said first file comprises encrypted data of said document;
   transferring said encrypted data of said document to said first driver;
   decrypting said encrypted data of said document; and
   storing said decrypted data in a second file located in a non-shared area.

2. The method as recited in claim 1 further comprising the steps of:
   determining if said service request to open said document is transmitted by an authorized user to open said document in an authorized application.

3. The method as recited in claim 2, wherein if said service request to open said document is a request transmitted by said authorized user to open said document in said authorized application then the method further comprises the step of:
   determining if said service request to open said document is a request to open an encrypted file.

4. The method as recited in claim 3, wherein if said service request to open said document is said request to open said encrypted file then the method further comprises the step of:
   blocking said request to open said document to said second driver by said first driver.

5. The method as recited in claim 1 further comprising the step of:
   modifying said service request to request said document in said second file.

6. The method as recited in claim 1 further comprising the step of:
   receiving a request to save said second file.

7. The method as recited in claim 6 further comprising the step of:
   issuing a call to said second driver to write modifications to said second file.

8. The method as recited in claim 7 further comprising the step of:
   encrypting data in said second file; and
   replacing data in said first file with encrypted data from said second file in said shared area.

9. The method as recited in claim 8 further comprising the step of:
   deleting said second file from said non-shared area.

10. The method as recited in claim 1, wherein said first driver is a driver configured to control service requests to encrypted files.

11. The method as recited in claim 10, wherein said second driver interfaces a file system maintained in said kernel space.

12. A computer program product having a computer readable medium having computer program logic recorded thereon for securing decrypted files in a shared environment, comprising:
    programming operable for receiving a service request to open a document by a first driver in a kernel space;
    programming operable for issuing a call to a second driver in said kernel space to read a first file of said document located in a shared area, wherein said first file comprises encrypted data of said document;
    programming operable for transferring said encrypted data of said document to said first driver;
    programming operable for decrypting said encrypted data of said document; and
    programming operable for storing said decrypted data in a second file located in a non-shared area.

13. The computer program product as recited in claim 12 further comprises:
    programming operable for determining if said service request to open said document is transmitted by an authorized user to open said document in an authorized application.

14. The computer program product as recited in claim 13, wherein if said service request to open said document is a request transmitted by said authorized user to open said document in said authorized application then the computer program product further comprises:
    programming operable for determining if said service request to open said document is a request to open an encrypted file.

15. The computer program product as recited in claim 14, wherein if said service request to open said document is said request to open said encrypted file then the computer program product further comprises:
    programming operable for blocking said request to open said document to said second driver by said first driver.

16. The computer program product as recited in claim 12 further comprises:
    programming operable for modifying said service request to request said document in said second file.

17. The computer program product as recited in claim 12 further comprises:
    programming operable for receiving a request to save said second file.

18. The computer program product as recited in claim 17 further comprises:
    programming operable for issuing a call to said second driver to write modifications to said second file.

19. The computer program product as recited in claim 18 further comprises:
    programming operable for encrypting data in said second file; and
    programming operable for replacing data in said first file with encrypted data from said second file in said shared area.

20. The computer program product as recited in claim 19 further comprises:
    programming operable for deleting said second file from said non-shared area.

21. The computer program product as recited in claim 12, wherein said first driver is a driver configured to control service requests to encrypted files.

22. The computer program product as recited in claim 21, wherein said second driver interfaces a file system maintained in said kernel space.

23. A system, comprising:
a processor;
a memory unit coupled to said processor, wherein said memory unit is operable for storing a computer program operable for securing decrypted files in a shared environment, wherein the computer program is operable for performing the following programming steps:
receiving a service request to open a document by a first driver in a kernel space;
issuing a call to a second driver in said kernel space to read a first file of said document located in a shared area, wherein said first file comprises encrypted data of said document;
transferring said encrypted data of said document to said first driver;
decrypting said encrypted data of said document; and
storing said decrypted data in a second file located in a non-shared area.

24. The system as recited in claim 23, wherein the computer program is further operable for performing the following programming step:
determining if said service request to open said document is transmitted by an authorized user to open said document in an authorized application.

25. The system as recited in claim 24, wherein if said service request to open said document is a request transmitted by said authorized user to open said document in said authorized application then the computer program is further operable for performing the following programming step:
determining if said service request to open said document is a request to open an encrypted file.

26. The system as recited in claim 25, wherein if said service request to open said document is said request to open said encrypted file then the computer program is further operable for performing the following programming step:
blocking said request to open said document to said second driver by said first driver.

27. The system as recited in claim 23, wherein the computer program is further operable for performing the following programming step:
modifying said service request to request said document in said second file.

28. The system as recited in claim 23, wherein the computer program is further operable for performing the following programming step:
receiving a request to save said second file.

29. The system as recited in claim 28, wherein the computer program is further operable for performing the following programming step:
issuing a call to said second driver to write modifications to said second file.

30. The system as recited in claim 29, wherein the computer program is further operable for performing the following programming steps:
encrypting data in said second file; and
replacing data in said first file with encrypted data from said second file in said shared area.

31. The system as recited in claim 30, wherein the computer program is further operable for performing the following programming step:
deleting said second file from said non-shared area.

32. The system as recited in claim 23, wherein said first driver is a driver configured to control service requests to encrypted files.

33. The system as recited in claim 32, wherein said second driver interfaces a file system maintained in said kernel space.

* * * * *

UNITED STATES PATENT AND TRADEMARK OFFICE
CERTIFICATE OF CORRECTION

PATENT NO. : 7,167,982 B2  Page 1 of 1
APPLICATION NO. : 09/952103
DATED : January 23, 2007
INVENTOR(S) : Elliott et al.

It is certified that error appears in the above-identified patent and that said Letters Patent is hereby corrected as shown below:

Claim 2, Column 9, line 29, delete "steps" and insert --step--;

Claim 8, Column 9, line 58, delete "step" and insert --steps--;

Signed and Sealed this

Twenty-eighth Day of August, 2007

JON W. DUDAS
*Director of the United States Patent and Trademark Office*